(12) United States Patent
Schnur et al.

(10) Patent No.: US 6,394,655 B1
(45) Date of Patent: May 28, 2002

(54) METHOD AND APPARATUS FOR INFLUENCING BACKGROUND NOISE OF MACHINES HAVING ROTATING PARTS

(75) Inventors: Jürgen Schnur, Ditzingen; Silvia Tomaschko, Ulm, both of (DE)

(73) Assignee: DaimlerChrylser AG, Stuttgart (DE)

( * ) Notice: Subject to any disclaimer, the term of this patent is extended or adjusted under 35 U.S.C. 154(b) by 0 days.

(21) Appl. No.: 09/332,113

(22) Filed: Jun. 14, 1999

(30) Foreign Application Priority Data

Jun. 13, 1998 (DE) .......................... 198 26 170

(51) Int. Cl.[7] .............................. F16C 25/06
(52) U.S. Cl. .................. 384/247; 384/519; 384/583
(58) Field of Search .......................... 384/624, 1, 247, 384/192, 519, 583

(56) References Cited

U.S. PATENT DOCUMENTS 5,221,146 A * 6/1993 Maruyama .................. 384/447

| 5,332,061 A | 7/1994 | Majeed et al. |
| 5,434,783 A | 7/1995 | Pal et al. |

FOREIGN PATENT DOCUMENTS

DE          195 31 402 A1    2/1997

* cited by examiner

*Primary Examiner*—Lenard A. Footland
(74) *Attorney, Agent, or Firm*—Crowell & Moring LLP

(57) ABSTRACT

A method and a shaft bearing for influencing machine background noise emitted by at least by one rotating part of the machine, especially for influencing the background noise within a passenger compartment of a motor vehicle. The amplitudes and/or the frequencies of primary vibrations which cause the background noise are preferably lessened and/or supplemented by controlled external interventions. The mounting conditions between the shaft bearing and a rotating part held in the machine shaft bearing, especially a shaft, is varied by a radial adjustment unit having piezo elements. The transfer function of the vibrations, especially the vibrations producing the sound waves, present between the rotating part and the shaft bearing or a component in contact with the shaft bearing, is varied.

1 Claim, 4 Drawing Sheets

METHOD AND APPARATUS FOR INFLUENCING BACKGROUND NOISE OF MACHINES HAVING ROTATING PARTS

CROSS-REFERENCE TO RELATED APPLICATIONS

This application is related to U.S. application Ser. No. 09/332114, filed on Jun. 14, 1999, entitled METHOD AND APPARATUS FOR INFLUENCING NOISE ORIGINATING FROM WINDOWPANES.

BACKGROUND OF THE INVENTION

This application claims the priority of 198 26 170.5-53, filed Jun. 13, 1998, the disclosure of which is expressly incorporated by reference herein.

The present invention relates to a method for influencing machine background noise which at least from a rotating part of the machine, and especially for influencing the background noise within a passenger compartment of a motor vehicle. The amplitudes and/or the frequencies of primary vibrations which cause the background noise are changed, preferably lessened and/or supplemented, as well as a shaft, the axis of rotation of the rotating part being disposed coaxially with the axis of rotation of the bearing, and with a radial adjustability for changing the mounting conditions of the rotating part in and on the shaft bearing.

Machines having rotating parts usually have at least one type of particularly disturbing background noise. One reason for this disturbing noise is due to the fact that, among others, the rotating parts, especially shafts, induce vibrations in other components. To transfer vibrations between components or for the introduction of vibrations from one component into another component, resonant frequencies are important. The mathematical connection of this frequency-related transfer is called "transfer function."

U.S. Pat. No. 5,332,061 discloses a method for suppressing vibrations applied to the car body and a corresponding vehicle. The applied vibrations in question, which among other things also lead to audible vibrations, originate from the motor and are transferred at the points where the motor is fastened to the body. To damp these vibrations the vehicle has shakers, i.e., mechanical vibration exciters which are disposed in the area of at least some points of connection of the motor with the body. When the motor is operated, the shakers are excited according to the motor's rotatory speed, opposite in phase to the vibrations coming from the motor, thereby at least damping the transfer of the introduced vibrations. The corresponding frequencies and amplitudes thereof for the secondary vibrations are in this case taken from a previously determined data chart.

U.S. Pat. No. 5,434,783 discloses a vehicle in which the noise background that is audible within the vehicle is affected by sound waves. In addition to normal loudspeakers, a piezo element is also used to excite the body to vibration at least in areas and thereby influences it to emit sound waves; i.e., the piezo element acts like the coil of a loudspeaker, while the body constitutes the vibrating diaphragm. With the previously known process and the previously known apparatus an improvement of the subjective impression is achieved within the passenger compartment.

A farther-reaching embodiment of the above development for influencing the subjectively perceived riding perception is disclosed in DE 195 31 402 A1. In accordance with a parameter, and in this case especially the motor speed and/or the velocity, not only the airborne sound but also the body sound and vibrations perceived by the body are influenced. For this purpose, data determined according to the magnitude of the parameter certain data are read out of a data field and converted with the aid of vibration exciters to secondary vibrations also perceivable by the body. By these measures, in conjunction with the affecting of the acoustically perceived airborne sound, both positive and negative interferences with the artificial secondary vibrations are produced by the primary vibrations forming at the motor vehicle end when the vehicle is operated. The interferences can, as desired, diminish the perceived impression, or else replace it with a certain impression, such as a shift in a vehicle provided with a stepless drive.

SUMMARY OF THE INVENTION

An object of the present invention is to produce a method and apparatus by which perceptible vibrations of a machine having rotating parts can be reduced.

This object has been achieved according to the present invention by a method in which the mounting conditions between the shaft bearing and a rotating part, especially a shaft of the machine, held for rotation in the shaft bearing is controllably varied. By varying the mounting conditions, the transfer function of the vibrations is varied, especially the vibrations producing the sound waves between the rotating part and the shaft bearing or a component in contact with the shaft bearing and by a shaft bearing the radial adjustability has a piezoelectrically active material. Through the radial adjustment unit, the effective radial stretching in the area of the rotating part to be mounted and/or the contact pressure on the rotating part is controlledly reversibly variable at least between two dimensions. By the targeted and reversible variation of the radial extent of a radial adjusting unit having especially piezo elements, or of the pressure applied radially to the rotating part, the mounting conditions of the shaft can be varied during operation by a targeted action from without.

Variation of the shaft mounting conditions brings about, for example, a change of the values of the natural vibrations of the rotating part and also the transfer function from the rotating part to another component. By changing the transfer function, the propagation of vibrations, i.e., the transferable energy, which comes from the rotating part to another component is varied, especially it is at least diminished.

In a radial adjustment unit, the engagement is performed by applying an electric voltage. This leads to a variation of the resonance frequencies and natural frequencies of the rotating part, and also to a change in the transfer and transmission of vibrations.

Also, in the manner mentioned, free play which varies due to temperature influences, for example, can occur while the rotating part is rotating. This is useful, for example, in compensating for play. This is useful preferably in the case of a crankshaft and/or camshaft as a rotating part of an internal combustion engine, particularly a diesel or gasoline motor, since the introduced vibrations, and especially the emission of sound within a passenger compartment of a vehicle driven by an internal combustion motor, can be influenced.

A use for the method and/or the apparatus of the present invention is expedient for rotating parts of electric motors, especially rotors, but also in aircraft engines, for example jet engines or propellers.

In a currently preferred manner, the use of the invention is desirable also for a crankshaft and/or camshaft of an internal combustion engine, preferably a diesel or gas engine, since then the introduced vibrations and especially the emission of sound thereby within a passenger compartment of an internal combustion engine-driven motor vehicle can be influenced. Preferably here the influence of the noise level perceived as especially annoying by the driver of a vehicle and coming at least in part from the motor is performed at the place where it develops and, not as has long been common, only at the place where it is perceived by the driver. In this manner, the expense involved in the electronic controls and accessory apparatus (microphone, loudspeaker and the like) is reduced.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
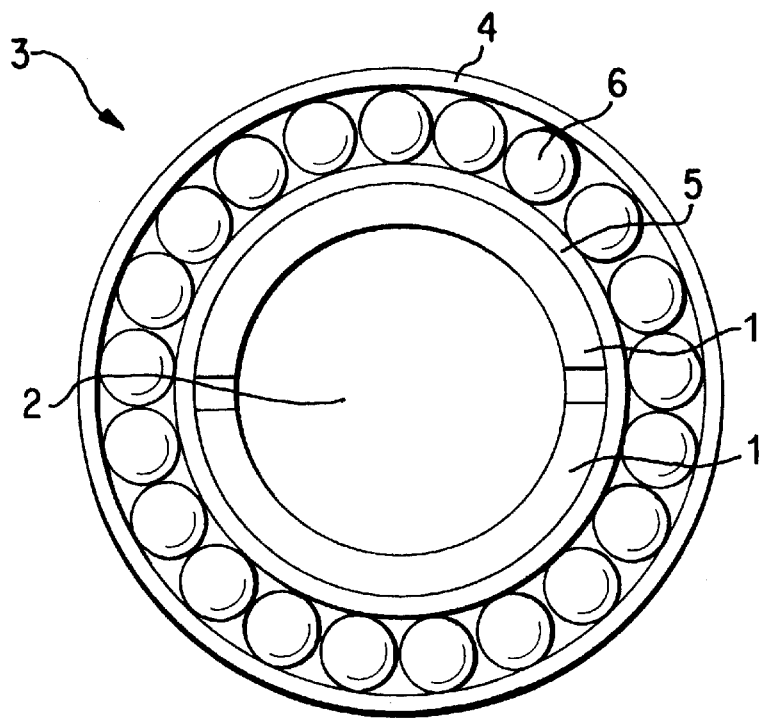
FIG. 1 is a view showing a shaft bearing with a bipartite radial adjustment unit disposed internally.

In FIG. 1, a shaft bearing 3 is shown designated generally by numeral in the nature of a ball bearing. It is, of course, to be understood that the invention is not limited to ball bearings, but extends to all possible shaft bearings, such as ball, roller or bushed bearings and the like. The shaft bearing of FIG. 1 has an outer race 4, an inner race 5, a radial adjustment unit 1 disposed inside of the inner race 5, and balls 6 disposed for rolling between the outer race 4 and the inner race 5.

The radial adjustment unit 1 is formed by two piezo elements in the form of half shells. The half-shell piezo elements of the radial adjustment unit 1 are spaced apart from one another on the inside of the inner shell 5, so that in the state of rest they are in intimate contact with the exterior surface of the rotating part 2.

An electrical contact is made with the half-shell piezo elements of the radial adjustment unit 1 in an expedient manner such that the shaft is connected to ground and the opposite, preferably positive, potential is applied to the inner race 5 of the shaft bearing 3. Preferably, the positive potential is applied to the entire shaft bearing 3, while the shaft bearing 3 should be electrically insulated from the component 7 in which it is mounted and its other surroundings.

Through the electrical contacts of the shaft bearing 3 the half-shell piezo elements of the radial adjustment unit 1 are expanded radially by the application of a direct electrical current, thereby varying the contact pressure with the shaft and thus changing its previous mounting conditions.

A tuning of the natural vibration of the rotating part is connected with the change in the shaft mounting conditions. By varying the geometry of the half-shell piezo elements of the radial adjustment unit 1, even any free play that might occur can also be compensated.

Furthermore, the half-shell piezo elements of the radial adjustment unit 1 can be excited to secondary vibration by applying an alternating current if vibration occurs in the rotating part 2. The secondary vibration can interfere with the occurring vibration, especially a natural vibration of the rotating part 2, so that the occurring vibration is changed and especially damped.

The secondary vibration is varied expediently according to the occurring vibration. For this purpose it is practical to absorb the occurring vibration, analyze it with a mathematical algorithm such as, for example, a Fourier transformation, and thus, with appropriately generated data sets, to excite the half-shell piezo elements of the radial adjustment unit to a corresponding secondary vibration.

Any complicated detecting and/or evaluating electronics for the occurring vibration can be dispensed with in a special manner if the data sets for controlling the shaft mounting conditions and/or the secondary vibration are taken from a preferably electronic data storage in which data sets previously obtained by sampling are recorded. Especially, a particular data set is accessed according to a parameter correlated with the operation of the rotating part 2. In other instances, it may be desirable to detect the vibrations that are occurring and select the data sets for the secondary vibration on the basis of the vibration detected.

If the rotating part 2 is a camshaft and/or crankshaft of an internal combustion engine, it is practical to vary the shaft mounting conditions and/or the secondary vibrations according to especially the rotatory speed and/or the crankshaft or camshaft angle of the internal combustion engine.

In a practical manner, the radial displacement of the radial adjustment unit 1 and the artificial generation of the secondary vibration can be connected together, thereby making the apparatus and the method of the invention more flexible. The combination of these two possibilities for the application of a shaft bearing 3 according to the present invention can be accomplished by using an alternating voltage as the electric voltage with an additional direct voltage (a so-called offset voltage). The offset voltage regulates the radial stretching or radial contact pressure of the half-shell piezo elements of the radial adjustment unit 1, while the alternating current excites the piezo elements of the radial adjusting unit 1 to the secondary vibration. Thus the half-shell piezo elements of the radial adjustment unit 1 perform a secondary vibration whose null point is situated at the location determined by the offset voltage.

In a shaft bearing 3 tightly held inside and out, a piezo element of the radial adjustment unit is capable of expanding but slightly physically, so that in this case the secondary vibrations are pressure vibrations, that is to say, radial flows of force are involved, which are transferred to the rotating part 2. The mounting conditions of the rotating part 2 are thereby likewise varied. Furthermore, the mounting conditions and/or the secondary vibrations can be varied in a special manner also in accordance with the temperature of the rotating part 2 and/or shaft bearing 3.

Figure 2:
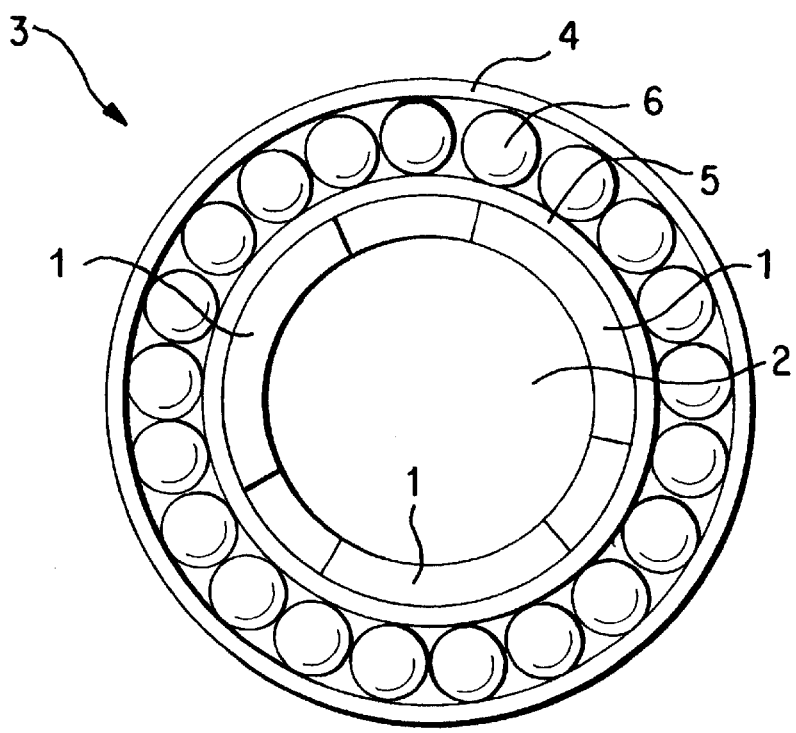
FIG. 2 is a view similar to FIG. 1 but showing a shaft bearing with internally disposed tripartite radial adjustment unit.
Figure 3:
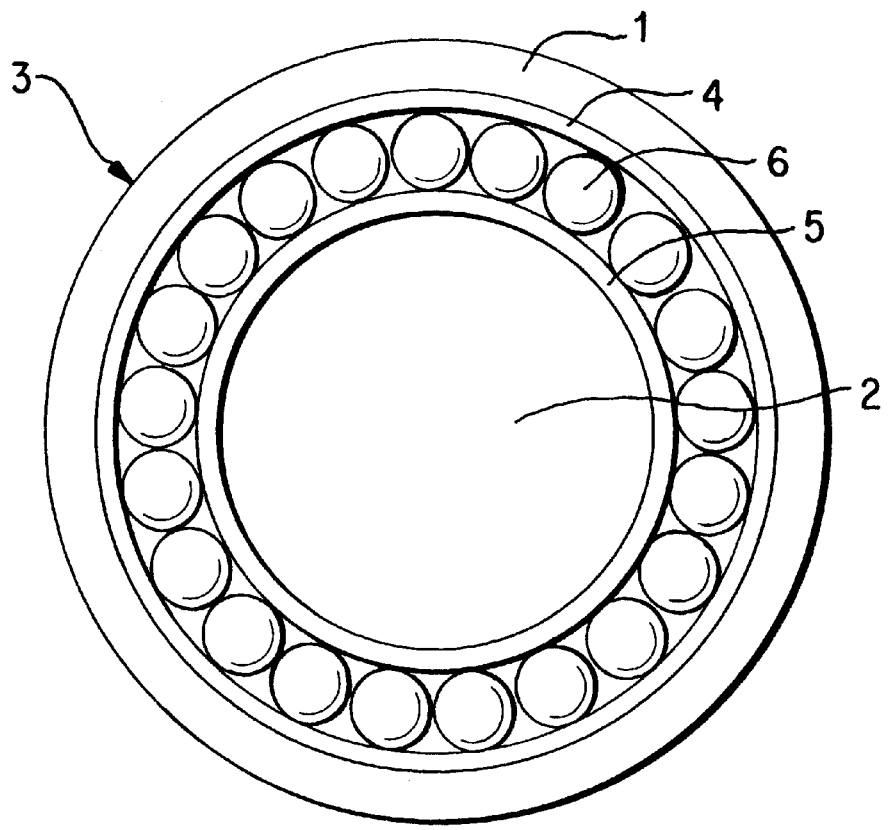
FIG. 3 is a view similar to FIG. 1 but showing a shaft bearing with externally disposed single radial adjustment unit.

In FIG. 2 there is shown an additional shaft bearing 3 which is similar to the one in FIG. 1. The difference between these two shaft bearings is that here the radial adjustment unit has three sector-shaped piezo elements. FIG. 3 shows another shaft bearing 3 in which the radial adjustment unit 1 is disposed on the outside surface of the outside race 4 with an annular piezo element which, if desired, can also have an axially running groove (not shown).

The shaft bearing 3 is disposed on the rotating part 2 such that its axis of symmetry is coaxial with the axis of rotation of the rotating part 2. Furthermore, the shaft bearing is supported on both its external surfaces, i.e., the inside of the inner race 5 lies on the outside surface of the rotating part 2 and the outer side of the piezo elements of the radial adjustment unit 1 lies on a component 7 surrounding it at least in certain areas.

For the electrical connection the inner side of the piezo element of the radial adjusting unit, facing the outside surface of the outside race 4, is connected to ground and the outer side of the piezo element of the radial adjustment unit 1 is connected to the positive potential.

If a radial free play occurs between the component 7 surrounding the shaft bearing 3 and/or between the shaft bearing 3 and the rotating part 2, an electrical voltage is applied to the piezo element of the radial adjustment unit 1. The electrical (direct) current varies the radial expansion of the piezo element of the radial adjustment unit. Thus the free play is at least reduced. Practically, the electric voltage is selected such that the variation of the radial expansion corresponds to the size of the free play.

If the shaft bearing 3 is in intimate contact at both its axially parallel outside surfaces, the radial expansion of the piezo element of the radial adjustment unit 1 can vary only minimally. In this case, the pressure on the rotating part 2 and the component 7 surrounding the shaft bearing 3 is increased and the shaft mounting conditions are varied.

If the electric voltage has an alternating voltage component, secondary vibrations in the form of pressure variations entailing great force can thus, as described above, be transferred to the rotating part 2 and to the component 7 surrounding the shaft bearing 3.

Figure 4:
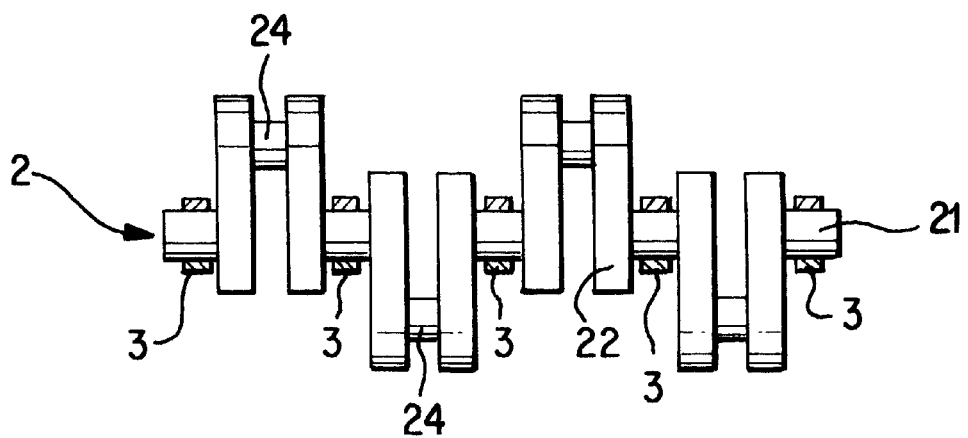
FIG. 4 is a view of a crankshaft with a plurality of shaft bearings according to the present invention.

In FIG. 4 a crankshaft having shaft bearings is represented as the rotating part 2. The crankshaft has two axially external main bearing ends 21. Along the axis of rotation, two crank arms 22 follow a main bearing end and between them a bearing pin 23 is disposed. A crank pin 24 follows the second crank arm 22 and is offset radially from the axis of rotation of the crankshaft. Then follows a crank arm 22, a crank pin 23, a crank arm 22, a crank pin 23, etc. The shaft bearings 3 according to the invention are disposed at the main bearing ends 21 and on the crank pins 23. In a preferred manner, the shaft bearings 3 are controllable separately from one another, so that the possibilities for variation of the influence exercised by the shaft bearings on the rotating part are increased.

Instead of rolling bearings, it is practical, for example with a crankshaft, to use so-called bushed bearings at least on the crank pins. Here the piezo elements can also form the bushed bearings. In a particularly useful configuration, these piezo elements used as bushed bearings and simultaneously as radial adjustment units 1 can have an antifriction coating on their surface facing the shaft. The antifriction coating, in turn, can in practice be a dry lubricant, preferably molybdenum sulfide ($MoS_2$) and, with special preference, boric acid ($H_3BO_3$).

Figure 5:
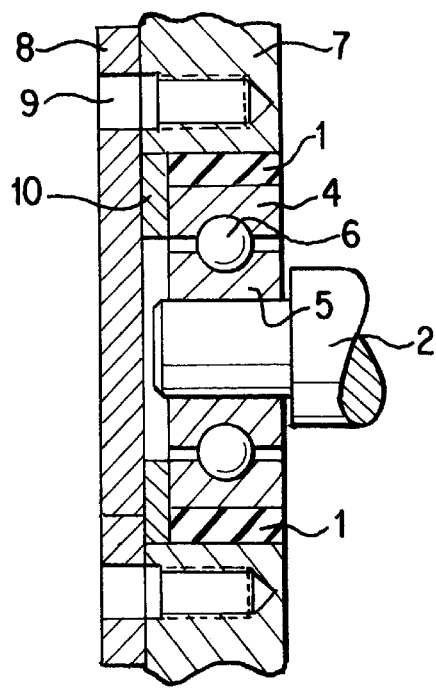
FIG. 5 is a detailed cross-sectional view of a rotating part mounted at the end in a surrounding component with radial adjustment unit disposed on the end.

FIG. 5 shows a rotating part 2 mounted in a surrounding component 7. The shaft bearing 3 is disposed at the end of the rotating part 2. This corresponds to the construction of the shaft bearing 3 in FIG. 3, so that further discussion is unnecessary. An annular backing ring 10 is disposed at the end of the rotating part 2 and covers the outer race 4 and the radial adjustment unit 1. The backing ring 10 lies with its two radial surfaces both against the radial adjustment unit 1 and against the outer race of the shaft bearing 3. An end plate 8 is in contact with the opposite radial surface of the backing ring 10. The end plate 8 is fastened by screws 9 to the surrounding component 7. With this construction, the radial adjustment unit 1 and the shaft bearing 3 is supported by the backing ring 10 against the end plate 8 in the axial direction and thus also against the surrounding component 7.

Figure 6:
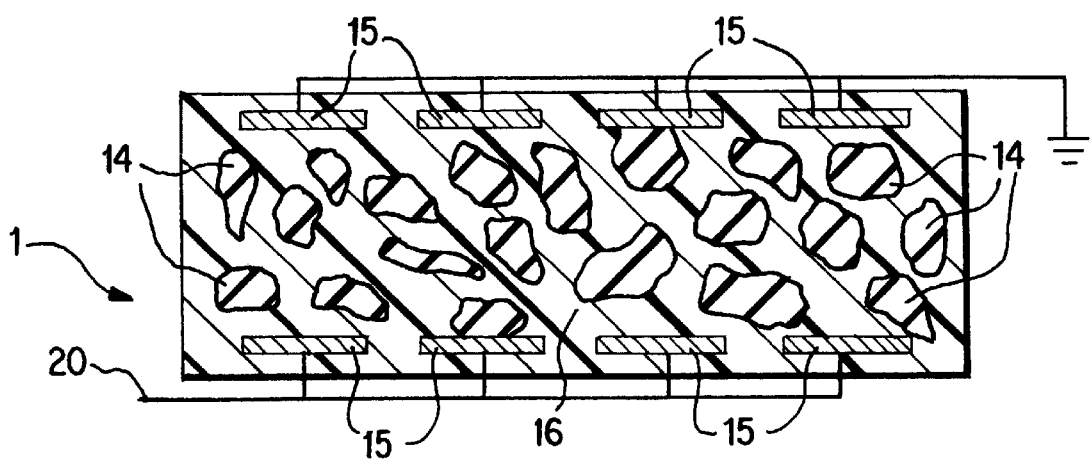
FIG. 6 is a cross-sectional view of a radial adjustment unit which is in the nature of a seal with integrated piezo elements.
Figure 7:
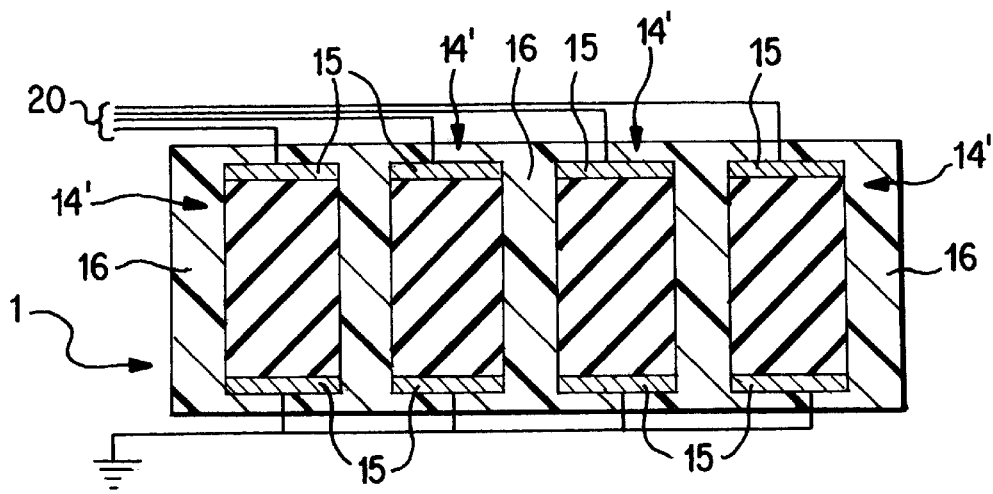
FIG. 7 is a cross-sectional view of a radial adjustment unit which is in the nature of a seal with integrated and oriented piezo elements.
Figure 8A:
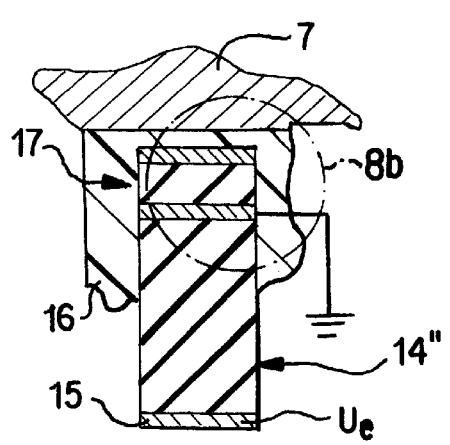
FIG. 8 is a split cross-sectional view of a radial adjustment unit and an enlarged section thereof, wherein the radial adjustment unit is in the nature of a seal with integrated and oriented piezo elements and with integrated contacts.
Figure 8B:
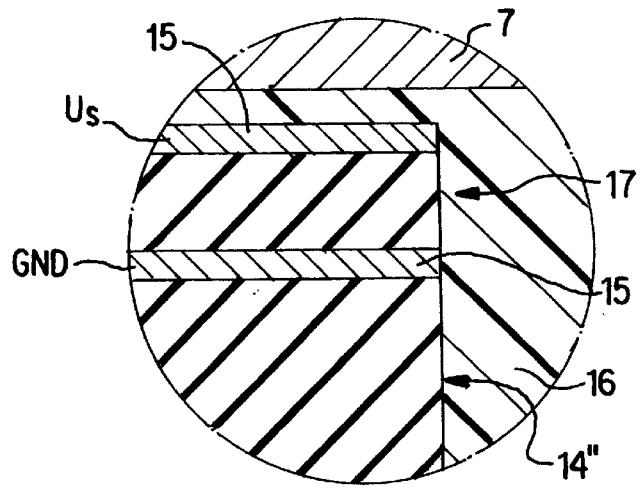

Instead of the radial adjustment units 1 represented in FIGS. 1 to 3, which are always formed entirely of piezo elements, it is also contemplated to make them in a special manner as seals in which the piezo elements 14, 14', 14" are disposed in a plastic matrix 16. Corresponding embodiments of these (active) seals are represented in FIGS. 6 to 8. In these seals it is an advantage that such radial adjustment units 1 perform, in addition to the sealing action, also a protective action on the piezo elements 14, 14', 14", which is to be attributed to the plastic matrix 16 of the seal that surrounds them.

FIG. 6 shows a seal of a radial adjustment unit 1 with a matrix 16 of preferably electrically conductive plastic, in which a plurality of piezo elements 14 of any size, orientation and physical shape are embedded. Such an arrangement is referred to generally as a 0–3-piezo ceramic polymer composite. In the wall of the seal electrical contacts 15 are expediently disposed, which are connected by electrical control lines 20 to a control unit (not shown).

Through the electrical contacts 15 the individual piezo elements 14 can, on one hand, be controlled, and, on the other hand it is possible to derive an electrical voltage that can be produced by vibrations transmitted from a rotating part 2 exerting a pressure on and deforming the piezo elements 14.

In one simple case, the electrical contacts 15 in a seal can be dispensed with. A deformation of the piezo elements 14 caused by transmitted vibrations also results in an electric voltage. The electric voltage is, however, used to cause a heating of the plastic matrix 16 of the seal, whereby the system is likewise damped.

In FIG. 7, an additional active seal of a radial adjustment unit 1 with a plastic matrix 16 has a plurality of piezo elements 14' embedded therein. In contrast to the embodiment in FIG. 6, these piezo elements 14' are of a specific size and shape and are also oriented. Such an arrangement is referred to generally as a 1–3 piezo ceramic polymer composite.

The individual piezo elements 4' can, depending on the advantages in a particular case, be solid, for example, and/or be formed of a plurality of individual layers of especially film-like and/or disk-like piezo ceramics laid one on the other. In comparison to the solid piezo elements, the voltage is lower in the multilayer system for the same stress and the same active surface area, while the current increases.

At the walls of the seal, electric contacts 15 are likewise disposed, which are likewise connected by electric control lines 20 to a control unit (not shown). Unlike the seal in FIG. 6, in the seal of FIG. 7 each piezo element 14' is individually contacted electrically and thus can also be controlled individually.

Through the electrical contacts 15, the individual piezo elements 14' can be individually excited to secondary vibrations at desired frequencies and amplitudes. The secondary vibrations can be made to interfere with the vibrations transmitted by the rotating part 2 and/or can be superimposed thereon. In the event of a negative interference, the noise produced previously without this influence can at least be reduced.

The piezo elements 14' of a radial adjustment unit 1 are preferably in the form of piezo stacks and/or are lamellar and especially arranged in line one behind the other in the seal. In the manufacture of the seal, the electrical contact is made with the piezo elements 14 thus arranged before they are embedded in the plastic forming the seal matrix 16. So that the seal of a radial adjustment unit 1 will also continue to serve its usual purpose, the plastic forming the matrix 16 is preferably made of a polymer, and especially of an elastomer.

In FIG. 8 there is shown an active seal of a radial adjustment unit 1 with a plastic matrix 16 in which a plurality of piezo elements 14" are embedded with associated piezo electric sensors 17. The piezo elements 14" are largely the same in type and orientation as those of FIG. 7.

Of course, a preferably piezo electric sensor 17 is placed after the elements toward their active axis. The sensor 17 has one common and one additional electric contact 16. The common contact 15, which is disposed between the piezo element 14" and the sensor 17 is grounded or at an electrical zero potential, i.e. ground potential.

The individual piezo elements 14" can be individually excited through the electrical contacts 16 to secondary vibrations at the desired frequencies and amplitudes. The secondary vibrations can be made to interfere with those vibrations transmitted from the rotating part 2 and/or superimposed thereon.

Advantageously, in a seal of a radial adjustment unit 1 with the sensor 17, any residual vibration remaining after the desired excitation of the piezo elements 14" can be determined and appropriately controlled. Thus, with the corresponding electronics, this piezo sensor element 4" forms a control circuit. For this reason, it is sometimes advantageous to arrange the sensor 17 after the excitable piezo element 14" in the direction of the power flow and/or parallel to the direction of the anticipated amplitudes or modes of the transferred vibration. Through the individual electrical contacts of each sensor 17 and of the particular piezo elements 14", the residual vibration can be detected and the introduction of the secondary vibration can be performed with good resolution and flexibility.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A shaft bearing to accommodate a rotating part comprised of a crankshaft or an engine cam shaft mounted for rotation inside of a shaft bearing, a rotation axis of the rotating part being disposed coaxially with a rotation axis of the shaft bearing, comprising a radial adjustment unit for varying mounting conditions of the rotating part in and on the shaft bearing, the radial adjustment unit having a piezo-electrically active material and being configured such that effective radial stretching in an area of the rotating part to be mounted and/or contact pressure on the rotating part is controlledly reversibly variable at least two dimensionally.

* * * * *